Patented May 21, 1946

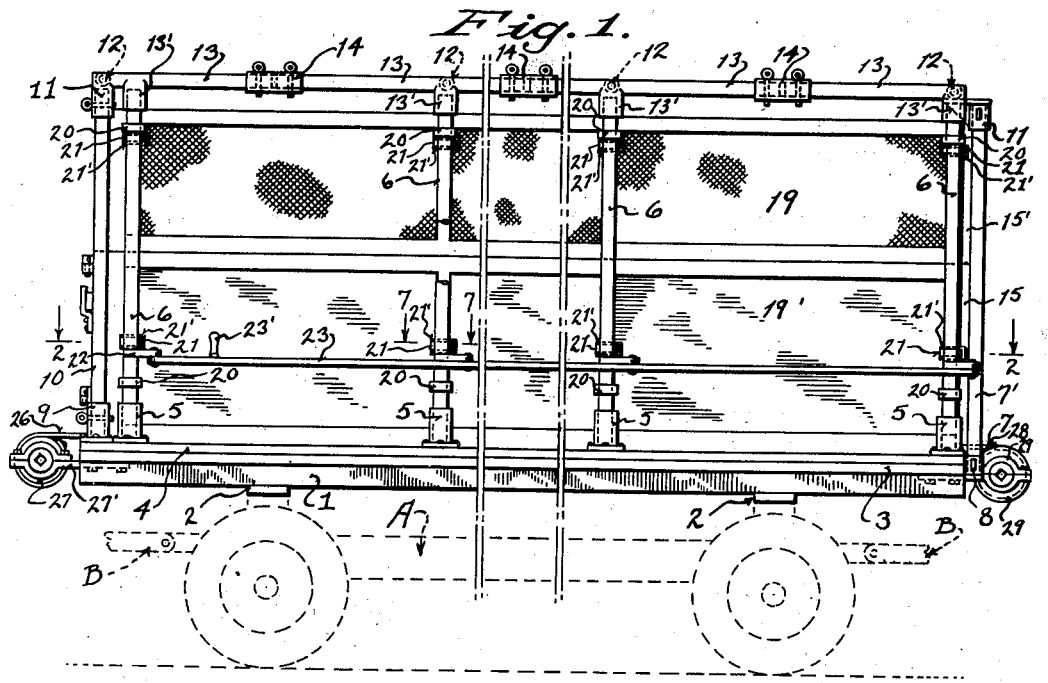
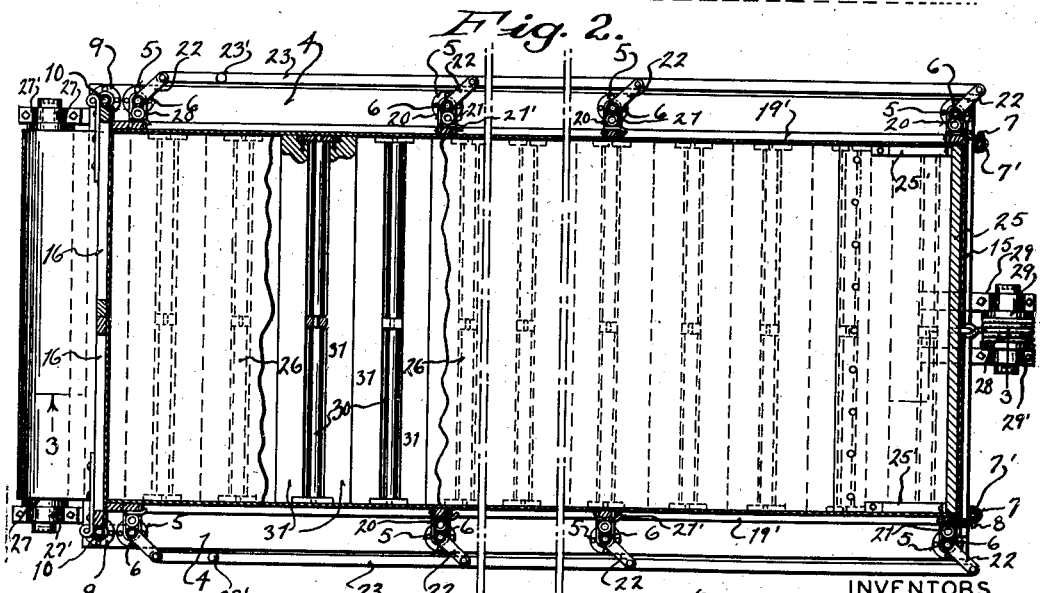
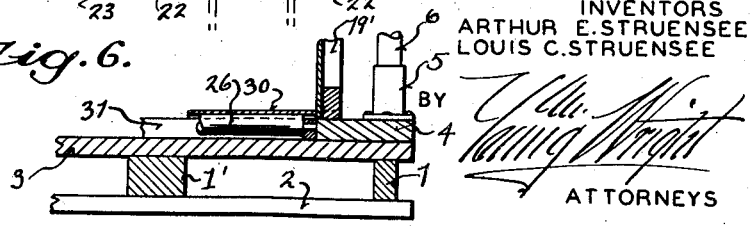

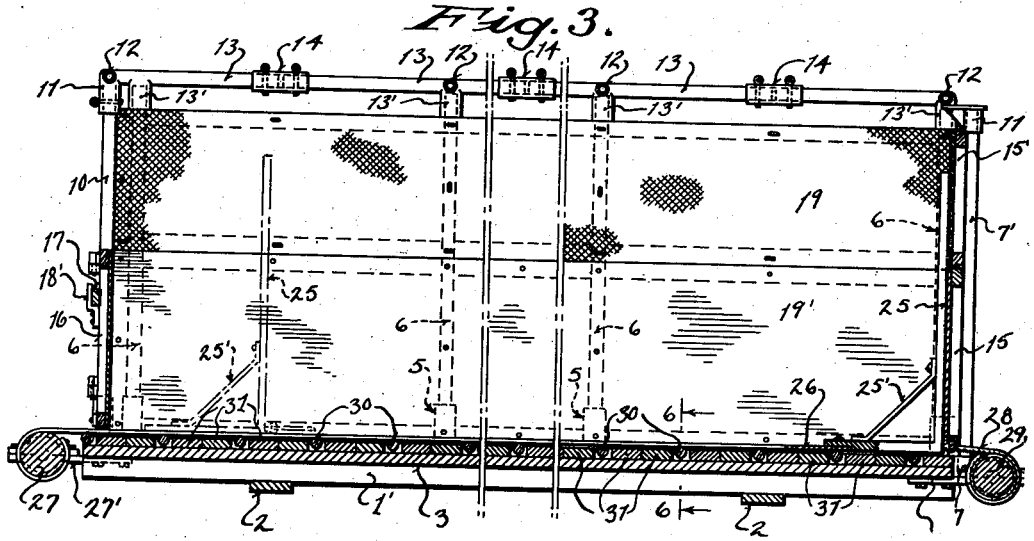
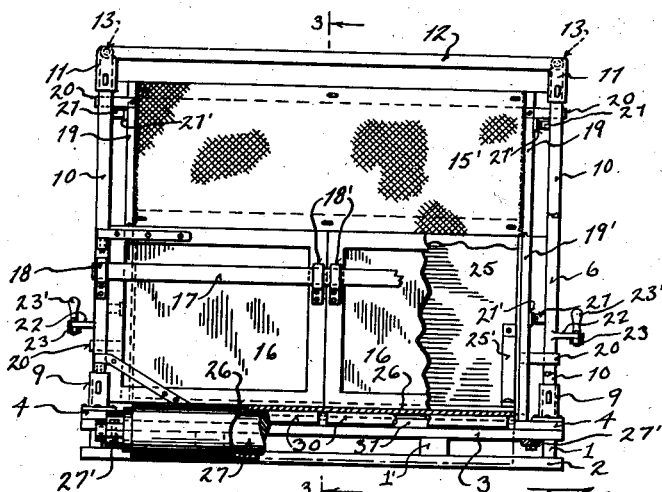
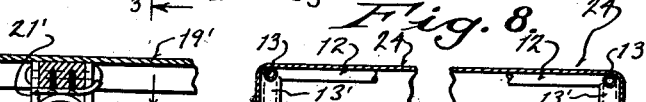
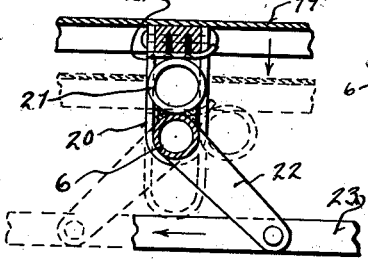

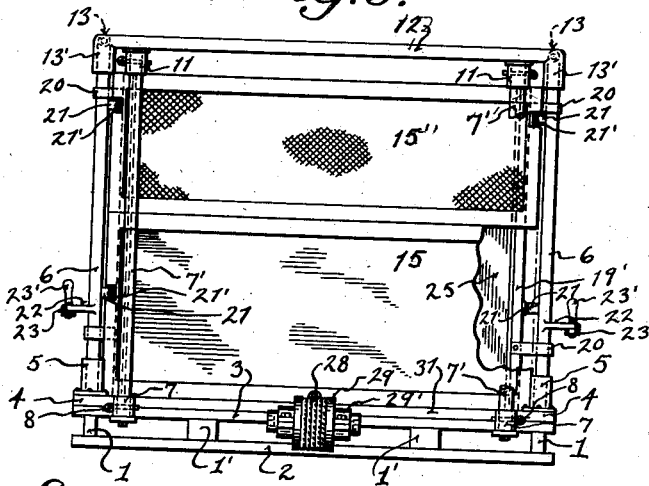
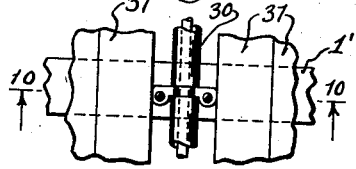
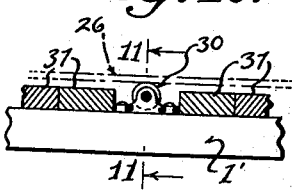
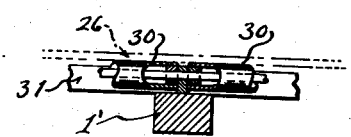
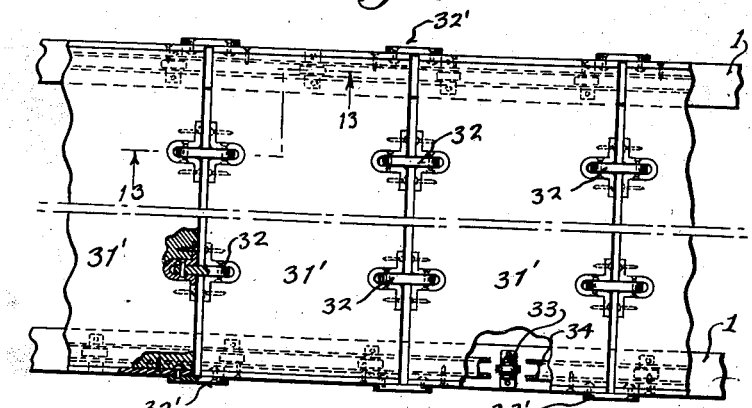
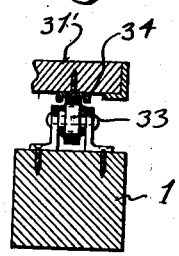
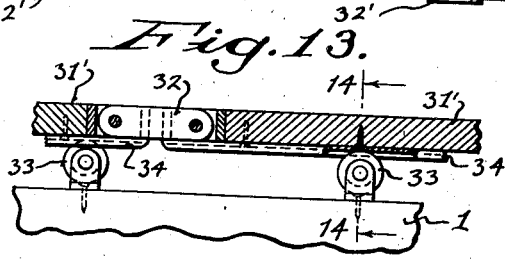
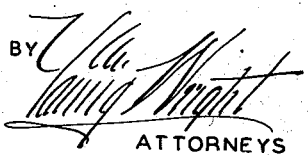

2,400,661

UNITED STATES PATENT OFFICE 2,400,661

CROP LOADER AND UNLOADER

Louis C. Struensee and Arthur E. Struensee, Oshkosh, Wis.

Application April 4, 1945, Serial No. 586,524

4 Claims. (Cl. 214—83)

Our invention has for its object to provide a body, mounted upon a wheel supported running gear, for transporting feed, small grain, shredded or chopped feed, pea vines, or like farm products.

The wagon may be provided with a double ended draw bar, whereby it is capable of being towed in the field, either forward of or behind a harvester, or feed or shred cutting machine of any type, equipped with a blower which will deliver the chopped feed directly into the open rear of the body. The blast from the cutting machine is of such force that the fine feed product is initially discharged through the length of the body to the front panel of the same. Thus, the product will be snugly packed from end to end of said body, and filled to the covered top of the same.

A further object of our invention is to provide the side walls of the body with means permitting expansion of said walls, to relieve friction of the body load, whereby said load may be readily removed therefrom, through the back end of the same.

Another object of our invention is to provide a flexible bottom for the body, with means for causing the flexible bottom to travel with the load in a mass from the front thereof, and discharge through the rear of said body, it being understood that this flexible bottom may be of any type, such as canvas, hingedly connected slats, or the like.

A further object of our invention is to provide a frame structure for the body, which is completely knocked down to facilitate an assemblage in manufacture and economy in shipping.

A still further object of our invention is to provide the side and end walls of the body in the form of removable panels, the upper panels being perfectly porous to permit ventilation, the said porous panels being of woven wire material.

With the above and other minor objects in view, the invention consists in certain peculiarities in construction and combination of parts, as will be hereinafter set forth with reference to the accompanying drawings and subsequently claimed.

In the drawings:

Figure 1 represents a side elevation of a body, embodying the features of our invention, the same being shown mounted upon a wheeled wagon gear, indicated in dotted lines, and having front and rear draft bars.

Figure 2, a sectional plan view of the body, the section being indicated by line 2—2 of Figure 1;

Figure 3, a sectional elevation of the body, the section being indicated by line 3—3 of Figure 4.

Figure 4, a rear elevation of said body, the parts broken away and in section to more clearly show structural features.

Figure 5, a front elevation of the body;

Figure 6, an enlarged detail fragmentary sectional view through a bottom corner of said body, the section being indicated by line 6—6 of Figure 3.

Figure 7, an enlarged detail sectional plan view, illustrating cam mechanism for relieving the side walls of the body from load strain, the section being indicated by line 7—7 of Figure 1.

Figure 8, a fragmentary cross section through the top frame portion of the body, provided with a cover.

Figure 9, a fragmentary plan view of another form of slat bottom for the body;

Figure 10, a longitudinal cross sectional elevation of the same, the section being indicated by line 10—10 of Figure 9;

Figure 11, a cross section of the same, the section being indicated by line 11—11 of Figure 10;

Figure 12, a fragmentary plan view of another modified form of body bottom, wherein the slats, in hinge connection, are adapted to travel and be discharged at the rear end of said body.

Figure 13, a fragmentary sectional elevation of the hinged slats, the section being indicated by line 13—13 of Figure 12, and Figure 14, a cross section of hingedly connected slats, illustrating a roller support therefor, the section being indicated by line 14—14 of Figure 13.

Referring particularly to Figures 1, 3 and 5, the body is supported upon a frame, comprising longitudinal outer beams 1, and parallel inner beams 1', connected by cross struts 2—2, and a floor 3, there being secured to the longitudinal edges of the floor 3, strips 4—4.

The frame is mounted upon a wheeled running gear A, as indicated in dotted lines, Figure 1. In practice, the frame is supported upon a slight incline from front to rear to facilitate discharge of the body contents.

The running gear is also provided with draw bars B—B at its forward and rear end, whereby said device is connected to a power unit for trailing the same from the front or the rear end.

Secured to the strips 4 of the frame, is an aligned series of flanged thimbles 5 for the reception of tubular side standards 6, which standards, under certain conditions, oscillate in the thimbles.

The front end of the body has secured to the floor 3 a pair of socket thimbles 7—7, into which are fitted tubular standards 7', the said standards being secured to the socket thimbles by keys 8.

The rear ends of the frame strips 4 have secured thereto socket thimbles 9 for the reception of tubular standards 10—10. The said standards are locked in their sockets by suitable keys, as best indicated in Figure 1.

The upper ends of the front and rear tubular corner standards 7' and 10 are fitted and keyed into the socket bosses 11, which depend from a rectangular tubular roof frame, embodying cross tubes 12 and sectional side tubes 13, which sections are aligned, and the tubes are coupled together by sleeves 14, keyed to the abutting ends of the tube sections 13.

The tube sections 13 have depending therefrom, socket bosses 13' for the reception of the ends of the vertically disposed series of side tubes 6, thus a rigid and knocked down skeleton frame is developed for the reception of side and end panels, to be hereinafter more fully described.

The front end panel is formed with a lower solid section 15, embodying a rectangular frame with a sheet metal filler. The upper section 15' of the panel comprises a frame having a vented filler, preferably formed from woven wire.

The above described sectional panel is held in place by abutting engagement with the side panels (to be hereinafter described) and the tubular frame standard 7'.

As best indicated in Figures 2, 3 and 4, the rear end of the body is partly enclosed by a pair of tail-gate doors 16. These doors are hingedly connected to the tubular standards 10 and locked in their closed position by a removable bar 17, which engages clips 18, extending from the standards 10, and similar clips 18' extending from the inner portion of the doors.

Thus, it will be noted that the rear end of the body is partially open and closed by the gates at its lower portion, it being understood that these gates are formed from frames and suitable solid metallic fillers.

The side panels comprise upper framed sections 19 and lower framed sections 19', which are similar to the solid and perforated sections, previously described, at the front end of the body.

The lower framed edge of the side panels 19', slidably engage the frame strips 4, and are horizontally confined with reference to the tubular standard 6 by metallic loops 20, extending from the panel frames of both upper and lower sections, the said loops being in engagement with the vertical frame tubes 6.

Both the upper and lower sections of the side panels are transversely held in their normal positions by upper and lower sets of cam-arms 21, which are welded to the vertically positioned side tubes 6, as best shown in Figure 7 of the drawings.

These cam-arms constitute, in effect, rocking cams, which, under normal conditions, engage rub plates 21', that are carried by the panel frames.

All of the tube standards 6, have extended therefrom crank levers 22, which levers are pivotally connected to an actuating bar 23, and the said bars may be provided with a suitable actuating handle 23'.

Hence, it will be seen that when it is desirable to relieve the pressure against the side panels, whereby the body contents which is packed solidly therein, may be removed easily by relief of said pressure, the cam-arms are shifted to the position indicated in dotted lines, Figure 7. The said shifting of the cam-arms cause the side walls to be freed, and will automatically expand. In some instances where the body load comprises cut straw, hay, or the like, which is discharged under blower pressure into the body, the same should have a cover over the top frame.

As shown in Figure 8 of the drawings, the top frame may be provided with a roof cover 24, the edges of which are secured in a suitable manner to the bosses 13'.

Referring particularly to Figure 3 of the drawings, positioned adjacent the front panels is a shiftable follower head 25, having a horizontally positioned foot 25', extending therefrom over the body bottom. Secured to the foot is a flexible apron 26, which extends the entire length and breadth of the interior walls of said body. The opposite end of this apron 26 is secured to a roller 27, which roller is journaled in brackets 27' that are secured to and project outwardly from the floor 3. The end of the apron is wound about the roller and secured thereto.

Thus, when it is desired to strip the load from the body, the tail-gates are opened and a lever is inserted into a rectangular socket, formed in the axis of the roller. The said roller is then rotated, causing the apron to be wound thereon and draw the follower head from the front of the body to the rear thereof, whereby the load is discharged.

In order to return the follower head and apron to their loading position, the follower head 25 has secured thereto a cable 28, which cable is wound about a roller 29, that is journaled in bearing brackets 29', which are secured to and extend beyond the floor 3.

Hence, to return the follower head to the position shown in Figure 3, the roller 29, which is pocketed, is fitted with the same lever previously used in connection with the roller 27. The said roller 29 is then revolved to wind the cable about it, which cable was previously unwound from said roller when the follower head is in its discharging position, as indicated in dotted lines, Figure 3.

While we have shown one simple means for manipulating the apron, it is understood that we may vary the same by providing means associated with the roller 25, whereby the apron and cable are connected thereto, forming what might be termed an endless cable and belt connection.

In order to relieve friction, due to load strain, upon the belt 26, we provide a series of transversely disposed tubular rollers 30. These rollers are journaled in ears extending from the floor 3, and also from a transversely disposed line of strips 31, which are positioned between the rollers, and secured to the floor 3, being of the same thickness as the strips 4, and arranged to abut the same, which is clearly illustrated in Figures 3 and 6 of the drawings.

Figures 9, 10 and 11 illustrate a modified form of body bottom frame flooring filler strips 31, directly mounted upon the frame beams 1 and 1', thus dispensing with the floor.

Figures 12, 13 and 14 illustrate a modified form of a travel apron, for moving the follower head 25 back and forth within the body. The transversely disposed apron boards 31', in this form of our invention, are closely positioned with relation to each other, and provided with a series of intermediate pivot links 32, and edge links 32'. These pivoted apron boards 31', extend over the frame beams 1, and said frame beams have mounted thereon, a series of anti-friction rollers 33, which rollers engage channel iron track sections 34, that are secured to each apron board and the inner apron board, is suitably secured to the foot 25' of the follower head. For operating this apron, composed of a series of hinged boards, the outer edge of said apron is extended over the roller 27, and in this instance, the said roller may be provided with lengthwise channels or lags, or possibly its peripheral surface may be polygonal.

It is apparent that when the roller 27 is rotated, the hingedly connected apron boards, will be drawn rearward, and in its movement, carry the follower head. In this particular instance, the hinged boards may simply fold one upon the other as they are fed to the ground surface by the roller movement.

Upper vented panel sections of the body are for the purpose of discharging therethrough the blast of air, which delivers the cut feed into the body, and the roof of said body will prevent upward escape of said feed, hence the feed is packed in a more or less solid mass, which is delivered through the open tail end of the body by proper manipulation of the apron and follower head.

However, when it is desired to load or stack coarser products into the body, wherein the blast of air is not utilized, the upper panels of said body may be removed, and also the top or roof cover 24. Thus it will be seen that the body may be utilized for transporting various farm loads ordinarily carried by a standard wagon body.

While we have shown and described several forms of our invention, it is understood that we may vary the structural features thereof within the scope of the claims.

We claim:

1. A wagon body comprising a bottom frame, oscillating standards extending therefrom, side panels connecting the standards, lock and release means carried by said standards, engaging the panels, a follower head mounted in the bottom of the body, a flexible apron connecting the follower head and rollers carried by the bottom frame, connecting the apron and follower head, for moving the same back and forth.

2. A wagon body comprising a bottom frame, oscillating standards extending therefrom, side panels connecting the standards, lock and release means carried by said standards, engaging the panels, a follower head mounted in the bottom of the body, a flexible apron connecting the follower head, and means connecting the apron and follower head for moving the same back and forth.

3. A wagon body comprising a bottom frame, oscillatory standards extending therefrom, side panels, loops carried by the side panels engaging the standards, cams extending from said standards engaging the side panels, crank levers extending outwardly from the standards, and actuating bars connecting the crank levers.

4. A wagon body comprising a bottom frame, oscillatory standards extending therefrom, side panels connecting the standards, lock and release means carried by said standards engaging the panels, a tubular rectangular roofing frame having sockets engaging the ends of the standards, a follower head mounted in the bottom of the body, a flexible apron connecting the follower head, and roller means carried by the bottom connecting the apron and said follower head for moving the same back and forth.

LOUIS C. STRUENSEE.
ARTHUR E. STRUENSEE.